3,000,983
PROCESS FOR THE HYDROGENATION
OF NAPHTHALENE
Robert A. Sanford, Homewood, and Stephen M. Kovach, Park Forest, Ill., assignors to Sinclair Refining Company, New York, N.Y., a corporation of Maine
No Drawing. Filed Aug. 12, 1958, Ser. No. 754,540
7 Claims. (Cl. 260—667)

This invention relates to a process for the hydrogenation of naphthalene using a platinum-alumina catalyst. More particularly, this invention pertains to a highly selective process for the hydrogenation of naphthalene in the vapor phase to produce tetralin and decalin while using a platinum-alumina catalyst.

Tetralin and decalin are useful for a wide variety of purposes. For instance, as solvents for resins, fats, essential oils, liquid and solid hydrocarbons, caoutchouc, sulfur, dyestuffs and the like. They are also used as dissolving and thinning agents in lacquers, varnishes, paints and enamels as well as in the manufacture of shoe creams and wax polishes. Additionally, decalin has some additional uses for example, it is the best known solvent for silicone materials. Moreover, trans-decalin is preferred to cis-decalin as a solvent due to its greater resistance to oxidation.

Tetralin, tetrahydronaphthalene, is a water-white, pleasant smelling liquid. It is non-poisonous, non-explosive and practically non-inflammable. Experiments have shown that even with a considerable internal dosage only slight toxic symptoms are observed. Decalin, decahydronaphthalene, is a water-white, transparent liquid with a mild odor. It has a higher rate of evaporation than tetralin, however, like tetralin, it evaporates without leaving any residue. It serves as a suitable thinner and will not cause discoloration even in white lacquer.

The physical properties of the hydronaphthalenes are tabulated below:

| Physical Properties | Tetralin | Cis-decalin | Trans-decalin |
|---|---|---|---|
| Boiling point, ° C./760 mm | 207.57 | 195.69 | 187.25 |
| Freezing point, ° C | −35.79 | −43.1 | −30.4 |
| Refractive index: | | | |
| 20 nD | 1.5413 | 1.4810 | 1.4695 |
| 25 nD | 1.5392 | 1.4788 | 1.4672 |
| Density, G./ml.: | | | |
| 20° C | .9702 | .8965 | .8925 |
| 25° C | .9662 | .8699 | .8659 |
| Flash point, ° C | 78 | 60 | 60 |

Present commercial production of hydronaphthalenes is low even though they have many known uses, for instance, as described above. Accordingly, if a lower priced product were available, a large market for hydronaphthalenes would probably be available. One of the factors that have kept the price level of hydronaphthalenes high in the past is believed due to the general requirement of liquid phase operation when using available hydrogenation catalysts. The effect of these limitations are substantially reduced since our process is highly selective and the catalyst employed produces excellent results in a vapor phase operation. Another desirable feature provided by our process resides in the production of a product containing high yields of hydronaphthalenes. Thus, a given producer may find that the product can be used directly which avoids the necessity for providing distillation facilities to separate the hydronaphthalenes from other ingredients in the product.

An object of the present invention is to provide an economical process for the hydrogenation of naphthalene in the vapor phase to produce tetralin and decalin. Another object of the present invention is to provide a selective process for the production of high yields of cis- and trans-decalin, and tetralin. Other objects and advantages of this invention will be apparent from the following description.

In the hydrogenation process of the present invention, naphthalene feed is hydrogenated in the vapor phase using a platinum alumina catalyst under controlled conditions of temperature, pressure and weight hourly space velocity to produce cis- and trans-decalin and tetralin. The recitation "weight hourly space velocity" or "WHSV" is used to indicate the weight of feed per hour per weight of catalyst in the reaction zone.

The catalyst contains platinum supported on an alumina base. The base is usually the major component of the catalyst constituting about 80–99.9 weight percent, preferably about 98.5–99.5. The catalyst base is an activated or gamma-alumina such as those derived by calcination of amorphous hydrous alumina, alumina monohydrate, alumina trihydrate or their mixtures. The catalyst base precursor most advantageously is a mixture predominating, for instance about 65 to 95 weight percent, in one or more of the alumina trihydrates, bayerite I, bayerite II (randomite) or gibbsite, and about 5 to 35 weight percent of alumina monohydrate (boehmite), amorphous hydrous alumina or their mixture. The alumina base can contain small amounts of other solid oxides such as silica, magnesia, boria, natural or activated clays (such as kaolinite, montmorillonite, halloysite, etc.), titania, zirconia, etc., or their mixtures.

The catalyst generally contains up to about 20 weight percent, usually about 0.1 to 2 weight percent, and preferably about 0.1 to 0.75 weight percent of platinum. The small amount of platinum may be present in the metallic form or as an oxide or other combined form. The metal may interact with other constituents of the catalyst, but if during use the platinum be present in metallic form then it is preferred that it be so finely divided that it is not detectable by X-ray diffraction means, i.e. it exists as crystals of less than 50 Angstrom unit size.

The preferred base or supporting material is an activated or gamma-alumina made by calcining a precursor predominating in alumina trihydrate. An alumina of this type is disclosed in U.S. Patent No. 2,838,444. The alumina base is derived from a precursor alumina hydrate composition containing about 65 to 95 weight percent of one or more of the alumina trihydrate forms gibbsite, bayerite I and bayerite II (randomite) as defined by X-ray diffraction analysis. The substantial balance of the hydrate is amorphous hydrous or monohydrate alumina. Trihydrates are present as well-defined crystallites, that is they are crystalline in form when examined by X-ray diffraction means. The crystallite size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in these applications the calcined catalyst can be characterized by large surface area ranging from about 350 to 500 or more square meters/gram when in the virgin state as determined, for example, by the BET adsorption technique. A low area catalyst prepared by treating the predominantly trihydrate base precursor is described in U.S. Patent No. 2,838,445. This base when in the virgin state has substantially no pores of radius less than 10 Angstrom units and the surface area of the catalyst is less than about 350 square meters/gram and most advantageously is in the range of about 150 to 300 square meters/gram.

The platinum-activated alumina composition can be prepared by known procedures. For instance, the platinum metal component can be deposited on a calcined or activated alumina, but it is preferred to add the platinum metal component to the alumina hydrate base precursor. Thus, platinum can be added through reaction of a halogen platinum acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750 to 1200° F. or more to provide the activated or gamma-alumina modifications.

The hydrogenation reaction conditions used in the method of the present invention include a temperature sufficient to maintain the naphthalene feed in the vapor phase under the pressure employed. Generally temperatures up to about 840° F., pressures up to about 740 p.s.i. and a WHSV up to about 20 or 200 can be employed. The catalyst can be used as a fixed, moving or fluidized bed or in any other convenient type of handling system, however, the fixed bed system seems more advantageous at this time. Free or molecular hydrogen must be present in our reaction system and the hydrogen to naphthalene molar ratio ($H_2/H'C$) will generally be greater than about 5 to 1 and usually from about 5 to 100:1. By controlling conditions of temperature, pressure and WHSV, a product can be produced such that either tetralin or decalin is the predominating constituent. For instance, a product containing 94 percent decalin or even a product containing 79 percent trans-decalin can be produced.

Generally, within the above ranges of temperature and pressure, the principal effect of WHSV upon production distribution is the tetralin to decalin ratio. An increase in WHSV results in a decrease of hydrogenation up to a practical maximum WHSV of about 20 or 200. Pressures within a range of about 50 to 740 p.s.i. and temperatures within a range of about 350° F. or 425° F. to 840° F. are normally used in our process. At the constant temperatures higher pressures favor decalin and then tetralin. At any constant temperature and pressure, if the WHSV increases above about 4, the product shifts from decalin to tetralin.

As described above, our naphthalene hydrogenation process for producing tetralin and decalin includes temperatures up to about 840° F., pressures up to about 740 p.s.i., a WHSV up to about 20 or 200, and a $H_2/H'C$ molar ratio generally greater than about 5 to 1. However, in the production of tetralin, the conditions may advantageously include temperatures from about 700 to 800° F., pressures from about 450 to 740 p.s.i., a WHSV from about 0.1 to 4, and a $H_2/H'C$ greater than about 5 to 1 and up to about 100 to 1. In the production of decalin, the conditions may advantageously include temperatures from about 400 to 700° F., pressures from about atmospheric or 50 to 700 p.s.i., a WHSV up to about 4, e.g. about 0.1 to 4, and a $H_2/H'C$ at least of about 15 to 1 or more up to about 100 to 1. Generally, as temperatures are raised, it is desirable to raise pressure within the ranges given. In the production of substantial quantities of tetralin, the conditions may advantageously include temperatures from about 550 to 700° F., pressures from about 100 to 500 p.s.i., a WHSV from about 10 to 200 and a $H_2/H'C$ molar ratio greater than about 5 to 1 and up to about 100 to 1. With higher temperatures it is desirable to use higher space velocities in the ranges stated.

The following examples will further illustrate our invention but they are not to be considered limiting.

EXAMPLE I

(A)

A platinum-alumina composition of the kind described in U.S. Patent No. 2,838,444, can be employed in the process of our invention. The composition of this application can be made as follows. Pure aluminum metal is dissolved in pure hydrochloric acid, and the resulting solution is mixed with deionized water to form an aqueous aluminum chloride solution and an alumina gel is prepared equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0. The flowing stream is passed to a stoneware container and an alumina hydrate is visible. The precipitated hydrate is filtered from the mother liquid and washed to <0.2 percent chloride by successive filtrations and reslurryings in deionized water until the desired chloride concentration is reached. The washed hydrate is covered with water in a container and aged at about 90° F. until it is approximately 70 percent trihydrate, the remaining being substantially of the amorphous or monohydrate forms. The total hydrate composition is comprised of about 42 percent bayerite, 18 percent randomite, 11 percent gibbsite, 20 percent boehmite, and 9 percent amorphous as determined by X-ray diffraction analysis. The aged hydrate is mixed with deionized water in a rubber lined container to provide a slurry of about 7 weight percent $Al_2O_3$ at a pH of about 8.0. A chloroplatinic acid solution in deionized water (0.102 gram platinum per/milliliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company Infra-red Moisture Meter containing a 125 watt bulb, Cat. No. 26675. The resulting mixture is forced through a die plate having holes 1/16" in diameter bolted to a 3½" Welding Engineers screw extruder. The resulting strands are broken to particles of length varying generally between about 1/16" to 1".

The particles are dried at 230° F. and calcined by heating to 925° F. in a flow of nitrogen gas followed by a flow of air while the catalyst is maintained at a temperature in the range of 865 to 920° F. The composition thus produced analyzes about 0.6 weight percent of platinum which is in sufficiently divided form so as to exhibit by X-ray diffraction studies the substantial absence of crystallites or crystals of size larger than 50 Angstrom units. After the calcination the composition has an area (BET method) within the range from about 350 to 550 square meters/gram.

(B)

The hydrogenation run is made in a universal one-inch internal diameter stainless steel reactor containing 70 g. of platinum-alumina catalyst prepared essentially as described above in (A) and containing 0.6 percent platinum. The catalyst is diluted pseudo-logarithmically with 16 to 20 mesh tabular alumina and the catalyst bed consists of 6 sections progressing from the top of the bed to the bottom, which contain 2, 4, 7, 12, 18 and 27 g. of catalyst, respectively, or fractions thereof. The reactor is heated with a radiant heat furnace while the temperature is controlled by thermostats and measured by means of Iron-constantan thermocouples spaced throughout the bed.

Solid feed naphthalene is melted and charged to a steam-jacketed graduated proportioning pump. Lines running from the graduated cylinder to the reactor are heated by heating tapes. Hydrogen is purified by passage through DEOXO (Pd—Al₂O₃) catalyst and silica gel. The hydrogen is metered to the reactor through a rotameter. The naphthalene hydrocarbon feed rate was controlled by the gear ratio setting on the pump. The naphthalene feed is charged into the reactor at a WHSV of 0.75 and hydrogen is introduced at a hydrogen to naphthalene feed molar ratio of 22.8 to 1. The liquid products are separated from the effluent gases in a liquid-level gauge and are released by means of a hand-controlled speed valve to a collecting flask at room temperature and atmospheric pressure. The volume of dry gas is measured by means of wet test meter and a continuous aliquot gas sample is taken for analysis. Conditions and an analysis of the products are tabulated below as run No. 622–61 in Table I, along with the results of separating the products by fractional distillation. The system as described above is also used in runs No. 622–70, –71, and –72, the conditions for and analysis of the products produced therefrom also being tabulated in Table I.

*Table 1.—Hydrogenation of naphthalene to tetralin and decalin*

| Run No | 622-61 | 622-70 | 622-71 | 622-72 |
|---|---|---|---|---|
| Catalyst | 0.6% Pt/Al₂O₃ | 0.6% Pt/Al₂O₃ | 0.6% Pt/Al₂O₃ | 0.6% Pt/Al₂O₃ |
| Weight (g.) | 70 | 15 | 7 | 4 |
| Feed | Naphthalene 0.12% S. | | Naphthalene 0.02% S | |
| Conditions: | | | | |
| Temperature, °F | 620–670 | 600–630 | 600–630 | 600–620 |
| Pressure, p.s.i.g | 400 | 150 | 150 | 150 |
| WHSV | 0.75 | 4.0 | 8.4 | 14.6 |
| H₂/H'C mole ratio | 22.8 | 21/1 | 20/1 | 19.5/1 |
| Recovery (weight percent feed): | | | | |
| Liquid (vol. percent) ᵃ | 104.0 (117.5) | 105.4 (113.4) | 105.1 (111.4) | 103.9 (109.0) |
| Dry gas (C₃–) | 2.3 | | | |
| Wet gas (C₄) | 1.5 | | | |
| Carbon on catalyst | 0.02 | 0.05 | 0.03 | 0.02 |
| Liquid product (weight percent): | | | | |
| Decalin | 94.2 | 55.7 | 48.5 | 28.5 |
| Tetralin | 5.4 | 36.9 | 44.3 | 57.9 |
| Naphthalene | 0.4 | 7.5 | 7.2 | 13.6 |
| Total | 100.0 | 100.1 | 100.0 | 100.0 |
| $n_D^{25}$ | 1.4705 | 1.5060 | 1.5125 | 1.5330 |
| FIA {A | 5.8 | 40.9 | 50.9 | 72.3 |
| {O | 0.8 | 0.8 | 0.7 | 0.5 |
| Fractionation of product: | | | | |
| (a) i–376° F. (weight percent) | 73.9 | 39.8 | 37.0 | 20.9 |
| Percent decalin | 100%-trans | 100.0 | 100.0 | 100.0 |
| (b) 376–400° F. (weight percent) | 15.3 | 16.2 | 13.6 | 10.7 |
| Percent decalin | 100% (35.8% trans) (64.2% cis). | 97.3 | 84.6 | 63.1 |
| Percent tetralin | Trace | 2.7 | 15.4 | 36.9 |
| (c) 400–412° F. (weight percent) | 10.8 | 26.6 | 34.4 | 50.2 |
| Percent tetralin | 47.0 | 99.5 | 99.4 | 98.1 |
| (d) 412° F. plus (weight percent) | | 17.4 | 15.0 | 18.2 |
| Percent tetralin | | 57.0 | 51.8 | 25.5 |

ᵃ Volume percent conversion of naphthalene to hydronaphthalene is based on density of naphthalene at 85° C.

It is claimed:

1. A process for selectively hydrogenating naphthalene, by controlling conditions of temperature, pressure and WHSV, to a hydrogenated product selected from the group consisting of (1) a product containing at least about 57.9 percent tetralin and (2) a product containing at least 55.7 percent decalin, the step comprising contacting the naphthalene in vapor phase with a catalyst comprising about 0.1 to 2 weight percent of platinum on activated alumina, under hydrogenating conditions including the presence of free hydrogen; said product predominating in decalin being prepared by hydrogenating conditions including temperatures from about 400–700° F., pressures from about atmospheric to about 700 p.s.i. and a WHSV from about 0.1 to 4; and said product predominating in tetralin being prepared by conditions including temperatures from about 550 to 700° F., pressures of about 100 to 500 p.s.i. and a WHSV from about 10 to 20.

2. A process for hydrogenating naphthalene by controlling conditions of temperature, pressure and WHSV, to produce a product containing at least about 57.9 percent of tetralin, the step comprising contacting the naphthalene in vapor phase with a catalyst under hydrogenating conditions including the presence of free hydrogen, temperatures from about 550 to 700° F., pressures from about 100 to 500 p.s.i., and a WHSV from about 10 to 20, said catalyst comprising about 0.1 to 2 percent of platinum on activated alumina.

3. The process of claim 2 wherein the platinum is about 0.1 to 0.75 weight percent of the catalyst and the alumina is derived by calcination by an alumina hydrate precursor consisting essentially of about 65 to 95 percent of alumina trihydrate and about 5 to 35 percent of a member selected from a group consisting of an amorphous hydrous alumina, alumina monohydrate, and their mixture and the activated alumina has an area of about 350 to 550 square meters per gram.

4. A process for hydrogenating naphthalene, by controlling conditions of temperature, pressure and WHSV, to produce a product containing at least about 55.7 percent of decalin, the step comprising contacting the naphthalene in vapor phase with a catalyst under hydrogenating conditions including the presence of free hydrogen, temperatures from about 400 to 700° F., pressures from about atmospheric to 700 p.s.i. and a WHSV from about 0.1 to about 4; said catalyst comprising about 0.1 to 2 weight percent of platinum on activated alumina.

5. The process of claim 4 wherein the platinum is about 0.1 to 0.75 weight percent of the catalyst and the alumina is derived by calcination by an alumina hydrate precursor consisting essentially of about 65 to 95 percent of alumina trihydrate and about 5 to 35 percent of a member selected from a group consisting of an amorphous hydrous alumina, alumina monohydrate, and their mixture and the activated alumina has an area of about 350 to 550 square meters per gram.

6. The process of claim 3 wherein the hydrogenating conditions include a hydrogen to hydrocarbon molar ratio of greater than about 5 to 1.

7. The process of claim 5 wherein the hydrogenating conditions include a hydrogen to hydrocarbon molar ratio of at least about 15 to 1.

References Cited in the file of this patent

UNITED STATES PATENTS

| | | |
|---|---|---|
| 2,101,104 | Smith et al. | Dec. 7, 1937 |
| 2,216,131 | Pier et al. | Oct. 1, 1940 |
| 2,481,921 | Gwynn | Sept. 13, 1949 |
| 2,757,128 | Hemminger | July 31, 1956 |
| 2,784,241 | Holm | Mar. 5, 1957 |
| 2,838,444 | Teter et al. | June 10, 1958 |
| 2,898,387 | Teter | Aug. 4, 1959 |